United States Patent
Assel

(10) Patent No.: US 6,527,095 B2
(45) Date of Patent: Mar. 4, 2003

(54) ONE-WAY FORCE TRANSMISSION

(75) Inventor: Martin Assel, Würzburg (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 09/811,850

(22) Filed: Mar. 19, 2001

(65) Prior Publication Data

US 2001/0027906 A1 Oct. 11, 2001

(30) Foreign Application Priority Data

Mar. 17, 2000 (DE) .......................... 100 13 262

(51) Int. Cl.[7] .......................... G05G 11/00; F16D 67/02
(52) U.S. Cl. ................. 192/17 R; 74/473.13; 74/502.2; 74/535; 192/215
(58) Field of Search ............. 192/17 R, 215; 74/473.13, 489, 502.2, 535

(56) References Cited

U.S. PATENT DOCUMENTS

| 4,155,270 A | * | 5/1979 | Juy | 74/473.13 |
|---|---|---|---|---|
| 4,876,913 A | * | 10/1989 | Romano | 74/473.13 |
| 5,134,897 A | * | 8/1992 | Romano | 74/473.13 |
| 5,213,005 A | * | 5/1993 | Nagano | 74/473.13 |
| 5,307,706 A | * | 5/1994 | Nagano | 74/489 |
| 5,615,580 A | * | 4/1997 | Chen et al. | 74/473.13 |
| 5,732,593 A | * | 3/1998 | Hwang et al. | 74/489 |
| 6,055,882 A | * | 5/2000 | Arbeiter et al. | 74/502.2 |

FOREIGN PATENT DOCUMENTS

| EP | 0 371 429 | | 6/1990 |
|---|---|---|---|
| EP | 0 485 863 A1 | * | 5/1992 |
| EP | 0 647 557 | | 4/1995 |
| FR | 2 701 917 | | 9/1995 |
| GB | 2 012 893 | | 8/1979 |

* cited by examiner

Primary Examiner—Rodney H. Bonck
(74) Attorney, Agent, or Firm—Cohen, Pontani, Lieberman & Pavane

(57) ABSTRACT

A one-way transmission with a resetting function for use in ratchet mechanisms. The resetting spring for the actuating lever is arranged to also takes over the prestressing of the one-way transmission element. The integration of the following switch components is also possible; the shift lever and the one-way transmission element; the shift lever, the one-way transmission element and the resetting spring; the positioning device and the positioning pawls; of the positioning device and actuating button; the actuating button and the resetting element; and the positioning device, the actuating button and the resetting element.

24 Claims, 5 Drawing Sheets

ONE-WAY FORCE TRANSMISSION

BACKGROUND OF THE INVENTION

The present invention relates to a one-way force transmission with a position block. This one-way force transmission is used in ratchet mechanisms, for example in lever switches, rotary-grip switches, trigger switches for the actuation of gear shifts on bicycles or in ratchets for tools, vehicle jacks and other applications where one-way force transmission and a resetting of the actuating element into the initial position are desired.

Ratchet mechanisms, such as used, for example, in switches for the actuation of bicycle gear shifts, are known from the patent specifications EP 0371429 A2, EP 0647557 B1, FR 2701917 and GB 2012893 A.

These switches contain a shift lever for winding up or winding on the shift assembly and a release lever or a release button for releasing a positioning device. The shift lever rotates the wind-on reel, via a one-way transmission element prestressed in the engagement direction, counter to a resetting spring acting on the shift assembly. The positioning device holds the wind-on reel in the unopened position and thus counteracts the resetting spring which acts on the shift assembly. The positioning action can be canceled in steps via a release button prestressed by a spring. After actuation, the shift lever is likewise returned into its initial position by a resetting spring and at the same time ratchets the sprung one-way transmission element via the sawtooth contour of the wind-on wheel.

It is necessary, in order to implement this wind-up and release function, to have a large number of structural parts, such as, for example, a shift lever with a resetting spring, a one-way transmission element with a prestressing spring, a wind-on reel with a sawtooth contour, a positioning device with positioning pawls and a prestressing spring and also a release button with a resetting spring.

This multiplicity of structural parts coordinated exactly with one another leads to a considerable outlay in terms of production and assembly and requires a corresponding construction space in the switch housing. Moreover, these structural parts must be designed with high stability due to the requirement of a long useful life, which also has an effect on the weight and costs of the switch unit.

SUMMARY OF THE INVENTION

The object of the present invention is, without the overall function being impaired, to reduce the number of structural parts required, to minimize the outlay in terms of manufacture and the outlay in terms of assembly and to reduce the weight and construction space.

This object is achieved, according to the present invention, essentially by a plurality of functions being combined into one structural part:

a) shift lever resetting and prestressing of the one-way transmission element by means of only one spring, relinquishment of the prestressing spring, b) the shift lever and one-way transmission element are one structural part, relinquishment of the separate one-way transmission element and of the prestressing spring, c) the shift lever, one-way transmission element and resetting spring are one structural part, relinquishment of the separate one-way transmission, the separate resetting spring and the prestressing spring, d) the positioning device and positioning pawls are one structural part, relinquishment of the separate positioning pawls and of a prestressing spring, e) the positioning device with positioning pawls and the actuating button with a resetting element or combinations of these components form one structural part, relinquishment of the prestressing spring, of the separate actuating button and of the separate resetting element, f) combination of the wind-on component into a wind-on module and of the positioning component into a positioning module, simplification of assembly.

In a preferred exemplary embodiment of the invention relating to a), the resetting spring, which returns the shift element, designed as a shift lever, into its initial position after actuation has taken place, is not tensioned between the housing or carrier part and the shift lever, as is customary, but is articulated on the housing and on the one-way transmission element. By virtue of this inventive arrangement of the resetting spring, on the one hand, the one-way transmission element in the form of a pivotable detent pawl is always prestressed in the direction of the toothed contour which is formed on the rotary element or on the wind-on reel and, on the other hand, the resetting of the shift lever is brought about. The detent pawl pivots about an axis which is connected fixedly to the shift lever and is prestressed against the sawtooth contour at the rotary element by the resetting spring which is articulated between the center of rotation and the pawl. As a result of this spring articulation, the additional prestressing spring otherwise required becomes superfluous and may be dispensed with. The prestressing force acting on the detent pawl is influenced, on the one hand, by the magnitude and direction of the spring force of the spring element and, on the other hand, by the position of the point of articulation or by the effective lever arm. This point of articulation for the resetting spring is, of course, selected on the detent pawl such that the latter is prestressed in the direction of the toothed contour, and is located on a radius emanating from the center of rotation of the shift lever, between the toothed contour of the wind-on reel and the center of rotation of the pawl. The arrangement of the point of articulation on the radius between the center of rotation of the detent pawl and the toothed contour makes it possible to vary the effective prestressing force from zero, when the spring force passes through the center of rotation of the pawl, to maximum, when the spring force acts on as small a radius as possible, for example approximately that of the toothed contour.

As is customary in ratchet mechanisms, in particular, in switches for bicycle gear shifts, a distinction is made between the actuation of the shift assembly in the wind-on direction, the holding of the wind-on reel in a selected shift position and the release of the shift assembly, which is under spring prestress, in the unwinding direction.

For winding on the shift assembly, essentially one actuating element in the form of a shift lever, one or more one-way transmission elements in the form of detent pawls and one wind-on reel provided with one or more toothed contours are required, which are arranged in a housing or a carrier part. Moreover, normally, a resetting spring ensures the resetting of the shift lever into the initial position and one or more prestressing springs ensure a reliable engagement of the one-way transmission elements into the sawtooth contour on the wind-on reel.

In an exemplary embodiment according to the invention which relates to b), one-way force transmission to the wind-on reel takes place by means of one or more one-way transmission elements which are prestressed radially and which form with the shift lever a structural part. A reliable space-saving and weight-saving transmission of shift force from the shift lever to the wind-on reel thereby becomes possible.

Since the one-way transmission elements are already prestressed in the radial direction and form with the shift lever a structural part, this inventive version dispenses, on the one hand, with the prestressing spring otherwise required and with the complicated assembly of the detent pawl, thus leading to the structural parts being minimized.

In the initial position, when the shift lever is not actuated, the one-way transmission element or one-way transmission elements are supported on the housing or carrier part, so that there is no engagement into the toothed contour of the wind-on reel. These one-way transmission elements have an elongate shape and are articulated on the shift lever on one side. They have, in the end region, a toothed or pawl shape suitable for engagement into the sawtooth contour of the wind-on reel and for the take-up of the latter.

These one-way transmission elements in the form of take-up tongues may be prestressed radially outward or inward. If they are prestressed outward, they are brought into engagement with the toothed contour of the wind-on reel, when the shift lever is actuated, virtually under positive control, by support on the housing, as a result of a geometric configuration, for example, in the form of an inclined plane or a ramp which is located on the tongue side located opposite the take-up tooth. When the take-up tongues are prestressed inward in the direction of the toothed contour of the wind-on reel, during the rotation of the shift lever and after the cancellation of the tongue support on the housing they are pressed onto the toothed contour of the wind-on reel and snap into the sawtooth contour. If, then, the shift force for winding on the shift assembly increases, the radially elastic take-up tongue can come to bear tangentially onto the outer contour of the wind-on reel for better force transmission and for support in the middle region. An improvement in redundancy, a reduction in the load on the take-up tongue and a uniform introduction of the force are afforded by the arrangement of two to three elastic take-up tongues.

When the shifting operation is concluded, a positioning element takes over the holding of the wind-on reel. A resetting element in the form of a spring returns the shift lever into its initial position again, the take-up teeth being brought out of engagement again due to the take-up tongues being supported on the housing.

In a preferred exemplary embodiment of the invention according to c), in addition to the one-way transmission elements in the form of take-up tongues, the arrangement of one or more elastic resetting elements is also provided. This resetting element may be arranged preferably as a pressure-loaded flexural spring between the shift lever and the housing or carrier part on the rear side of the actuating face of the shift lever. In this case, this resetting element either may be produced from the same material as the shift lever and the take-up tongues or consists of a material with higher elasticity or better spring properties. Depending on the manufacturing method, this resetting element may be connected to the shift lever by known releasable connection means, for example screws, clamps, etc., or unreleasably, for example by extrusion-coating or injection-molding.

The integration of the essential functional parts, such as the elastic one-way transmission element without the additional prestressing spring and the elastic resetting element, in the shift lever has a positive effect on weight, construction space, noise and manufacturing costs and on the necessary outlay in terms of assembly.

After the rotary element or the wind-on reel has been brought into the desired position by the actuating element or shift lever, a positioning element assumes the holding function, until, where appropriate, a release of the rotary element or of the wind-on reel becomes necessary. This positioning element consists conventionally of a holding element equipped with pawls or teeth, of a prestressing spring which ensures a reliable engagement of the holding elements in the toothed contour of the wind-on reel, of a release element, if appropriate also the actuating lever, in order to allow a controlled release of the rotary element in the unwinding direction, and of a resetting element in order to return the actuating element into its initial position. It must be ensured that, during release, the wind-on reel prestressed in the unwinding direction by a shift assembly rotates no more than one shift position further. For this purpose, the holding element pivotable about an axis of rotation has two holding legs which are provided with teeth of which always one is in engagement. When a holding leg is brought out of engagement by the actuating element, the tooth of the second leg already bears on the toothed contour of the wind-on reel and thus allows only a defined rotation of the wind-on reel. In conventional switches, this release which takes place in steps requires a finely coordinated geometry and narrow manufacturing tolerances, since different shift travels also often have to be implemented. In order to increase functional reliability, two individual sprung holding legs are also used.

According to a further feature d) of the invention, the positioning element necessary for holding the wind-on reel has two positioning pawls which are arranged at the leg ends and which are connected elastically to one another in the middle region of the positioning element. In the installed state, the positioning pawls are prestressed against the wind-on reel, thus ensuring that the two positioning pawls bear on the corresponding toothed contour of the rotary element. If, then, just the first positioning pawl located in the holding position is brought out of engagement by the actuating element, preferably an actuating button, the second positioning pawl assumes the holding function after a defined rotational movement of the wind-on reel. When the actuating button is released, a spring element returns the latter to its initial position again, at the same time the second positioning pawl which has just taken effect is brought out of engagement by the actuating element and the rotary element is held by the first positioning pawl again after a further defined rotational movement. These defined rotational movements are coordinated in such a way that the entire unwound shift-assembly length corresponds to the respective shift travel required. The positioning element forms with the positioning pawls a structural part and, by virtue of its flexibility and elasticity, makes it possible that an engagement face of the positioning pawls can be brought completely out of engagement even before the second engagement face of the other positioning pawl engages completely into the sawtooth contour of the rotary element. The use of an elastic material, preferably plastic, allows a cost-effective and tolerance-insensitive design of the positioning element without an additional prestressing spring.

According to a further feature e) of the invention, the positioning element and the actuating button or the actuating button and resetting element or the positioning element with positioning pawls and the actuating button and also the resetting element form a structural part. In this case, to ensure the release movement, the actuating button is connected to the positioning element in a highly moveable way, for example by means of a film hinge or a thin strip of material. The resetting element, in the form of a flexural spring, is articulated in the region of the actuating button and is supported on the housing. These different design variants allow a further reduction in the number of structural parts, as compared with conventional switch versions, since the prestressing spring for the positioning pawls is dispensed with and, if the components are combined in a skillful way, neither a separate actuating button nor a separate resetting element has to be mounted individually.

As a further inventive feature f), it is proposed, in order to simplify the assembly of the switch, to combine the shift components essentially into two functional modules. On the one hand, the components required for the winding-up operation are combined in a wind-on module. It is composed of the actuating, resetting and one-way transmission element or forms a common structural part. In the actual execution of the switch, the wind-on module is composed of the actuating lever with integrated resetting spring and with integrated prestressed take-up tongues. On the other hand, the components necessary for positioning and release are combined in a positioning module. It is composed of the positioning element equipped with two positioning pawls, of the release element and of a resetting spring. These modules are arranged essentially around the rotary element or wind-on reel and engage there into the respective toothed contour. These modules or functional units arranged essentially concentrically around the wind-on reel, on the one hand, allow accommodation in a very compact housing. On the other hand, the switch components subjected to mechanical stress, such as the one-way transmission elements and the positioning pawls, come into action on a relatively large effective radius. The introduction of force takes place on the sawtooth contour formed on the circumference of the wind-on reel, and because of the relatively large lever arm the mechanical load on the corresponding structural parts is reduced.

A skillful use of plastic materials and the utilization of the material-specific flexibility and elasticity allow an integration of the spring function into the actuating element for resetting and into the one-way transmission elements for prestressing in the radial direction.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
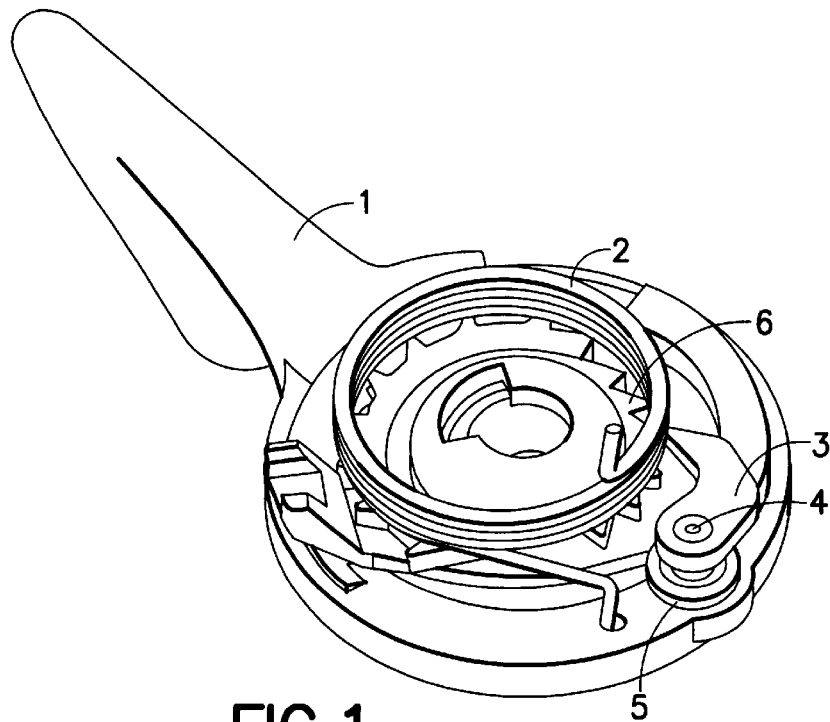
FIG. 1 shows the prior art for one-way transmission, in particular the arrangement and articulation of the shift-lever resetting spring and of the detent-pawl prestressing spring on a shift lever.

FIG. 1 shows the spring arrangement on a shift lever 1 for a bicycle gear shift according to the prior art. A resetting spring 2 is articulated at one end on the shift lever 1 and, in the installed state, the other end is supported on the housing, not shown here. This resetting spring 2 returns the shift lever 1 into the initial position again after the shifting operation. The one-way transmission element 3 in the form of a detent pawl pivots about an axis 4 which is connected fixedly to the shift lever 1. A prestressing spring 5 is arranged about the axis 4 and is supported at one end on the shift lever 1 and with the other end prestresses the detent pawl 3 against the toothed contour 6 on the rotary part or wind-on reel, not shown here.

Figure 2:
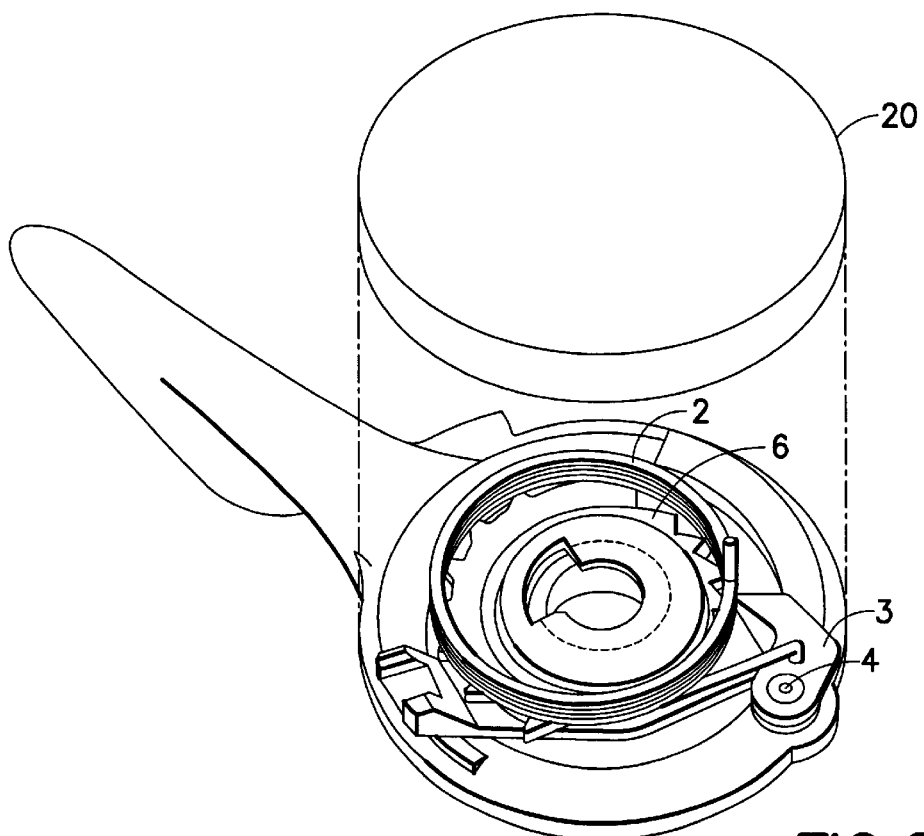
FIG. 2 shows a shift lever with one-way transmission, in particular the inventive arrangement of the shift-lever resetting spring on the detent pawl.

According to FIG. 2, the prestressing spring 5 for pressing the one-way transmission element 3 is dispensed with. This prestressing function is assumed by the resetting spring 2 which is supported at one end on the housing 20 and with the other end both prestresses the one-way transmission element 3 against the toothed contour 6 and also resets the shift lever 1 after the shifting operation. The point of articulation of the resetting spring 2 is located between the center of rotation of the detent pawl 3 and the detent pawl end provided with a toothed geometry. The necessary prestressing force can be influenced by means of the position of the spring articulation point.

Figure 3:
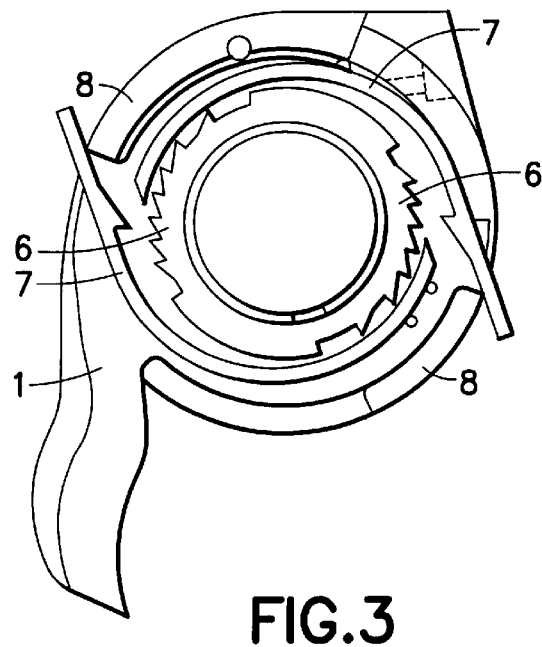
FIG. 3 shows a shift lever with integrated one-way transmission elements in the position of rest.

FIG. 3 shows one-way force transmission by means of one-way transmission elements in the form of prestressed take-up tongues 7 which are elastic in the radial direction and which, when the shift lever 1 is actuated, engage into the toothed contour 6 and thus rotate the rotary element or the wind-on reel in the wind-on direction. The take-up tongues 7 are connected fixedly on one end region to the shift lever 1. In this illustration, the shift lever 1 is in the position of rest. The radially elastic take-up tongues 7 equipped with teeth are not in engagement, but are supported with their free end region on the housing portion 8. This ensures that the teeth of the take-up tongues 7 do not catch in the toothed contour 6 on the wind-on reel during the unwinding operation.

Figure 4:
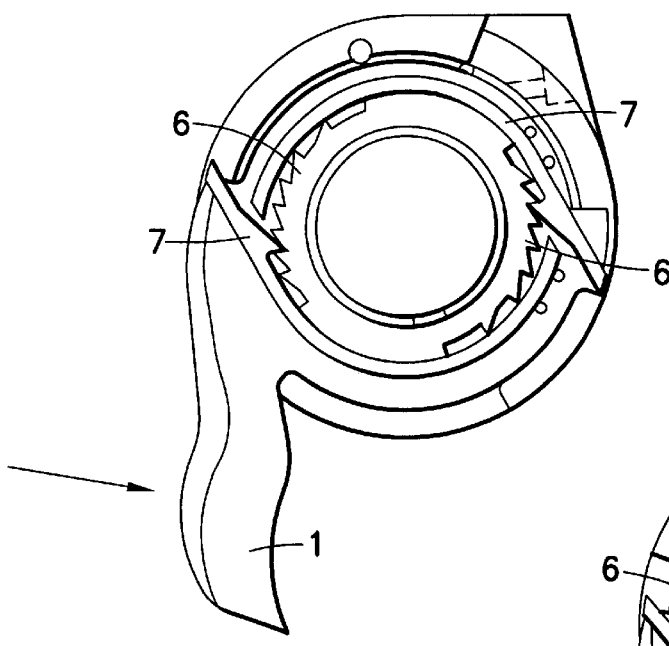
FIG. 4 shows the engagement of the one-way transmission elements into the toothed contour of the wind-on reel at the start of the shifting operation.
Figure 5:
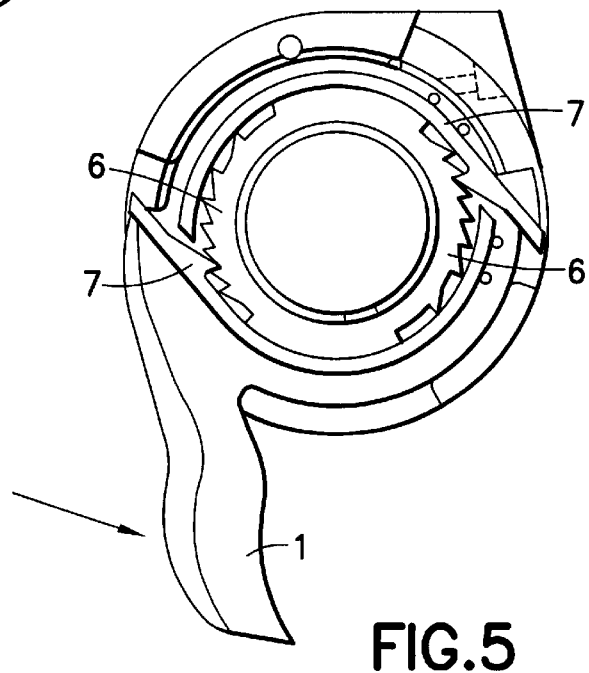
FIG. 5 shows the engagement of the one-way transmission elements into the toothed contour of the wind-on reel during the shifting operation.

FIG. 4 shows the initial phase of the shifting operation and FIG. 5 the engagement of the one-way transmission elements during the shifting operation. The shift lever 1 has been moved out of the position of rest in the shifting direction. The teeth on the prestressed take-up tongues 7 engage into the toothed contour 6 of the wind-on reel and take-up the latter in the wind-on direction. During the transmission of the shift forces from the shift lever 1 to the wind-on reel, the radially elastic take-up tongues 7 are supported with their middle portion on an outer region of the wind-on reel, said outer region not being equipped with a toothed contour. The arrangement of two or more take-up tongues 7 reduces the shift forces to be transmitted per take-up tongue and leads to force equalization in terms of the shift forces resulting in the reel axis.

Figure 6:
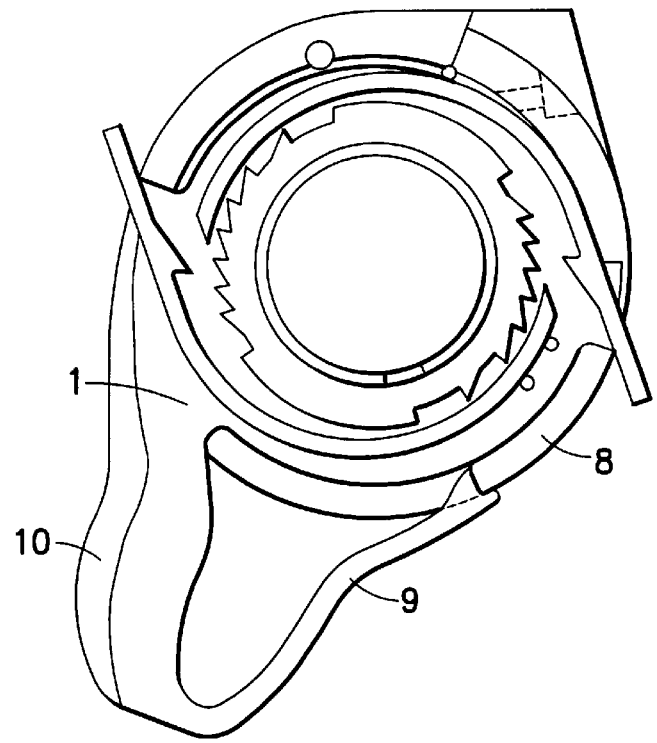
FIG. 6 shows a shift lever in the position of rest with integrated one-way transmission elements and with a relaxed resetting spring.
Figure 7:
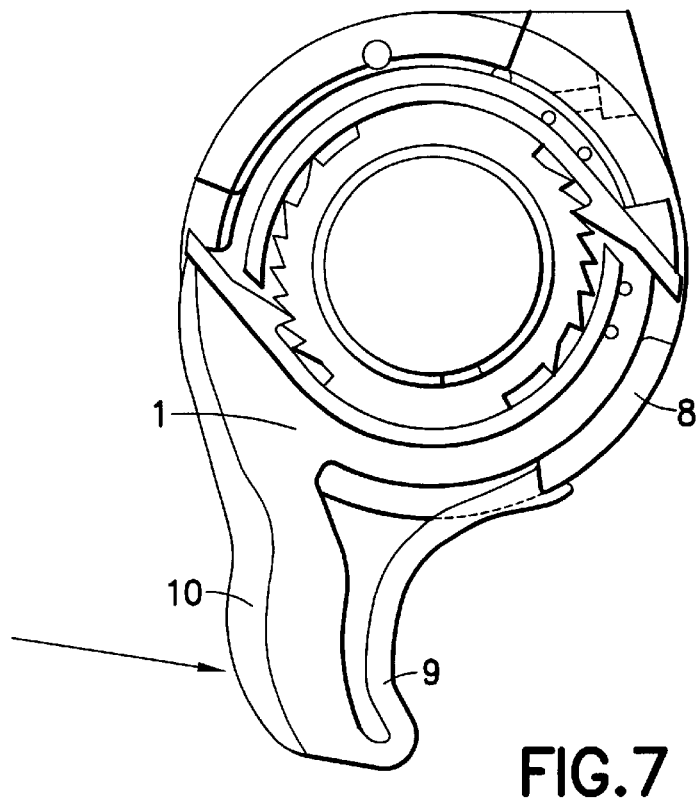
FIG. 7 shows a shift lever during the shifting operation with integrated one-way transmission elements and with a tensioned resetting spring.

According to FIG. 6 and FIG. 7, the shift lever 1 has a resetting spring in the form of a flexural spring 9 which engages relatively far outward on the switch side located opposite the actuating face 10 and which is supported on the housing portion 8. The resetting spring or flexural spring 9 forms with the shift lever 1 a common structural part. The shift lever 1 is in the position of rest in FIG. 6 and in an actuating position during the shifting operation in FIG. 7.

Figure 8:
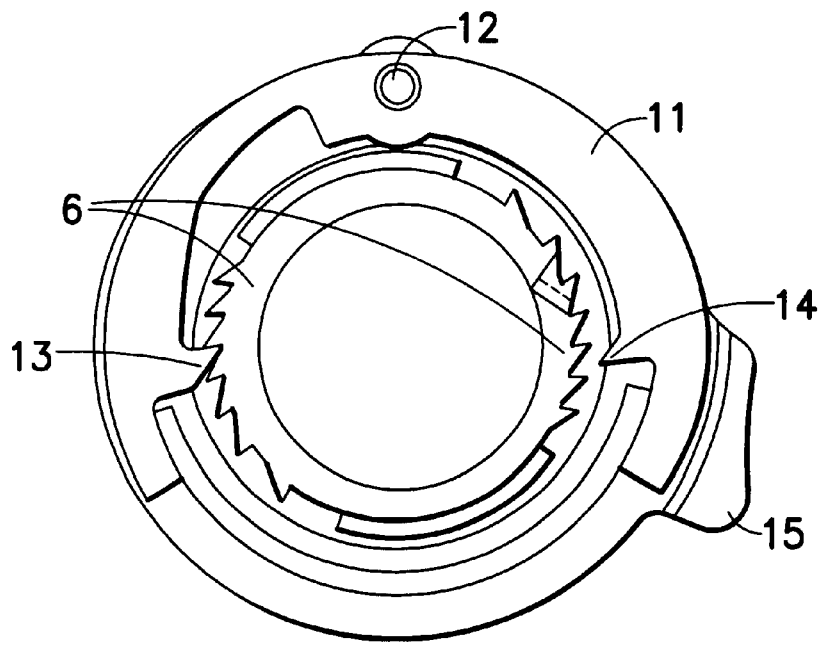
FIG. 8 shows the arrangement of a positioning element before a shifting operation.

FIG. 8 shows the arrangement of a positioning element 11 in a switch during a shift intermission. The positioning element 11 can be pivoted about a center of rotation or pivot axis 12 which is connected fixedly to the shift housing. The positioning element 11 is elastic in the middle region and has a first positioning pawl 13 and a second positioning pawl 14 which are prestressed in the direction of the toothed contour 6. When the actuating button 15 is not pressed, the first positioning pawl 13 engages into the toothed contour on the wind-on reel and secures the current shift position counter to a permanently acting spring force introduced by a shift assembly.

Figure 9:
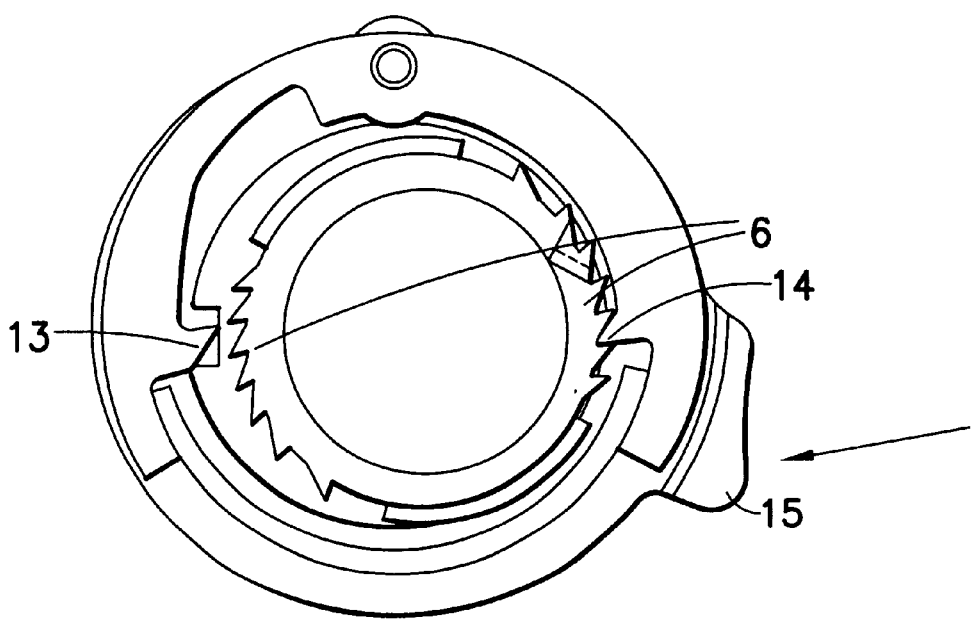
FIG. 9 shows the position of the positioning element when the shift button is pressed.

FIG. 9 shows the actuating button 15 in the pressed position. The positioning pawl 14 engages into the toothed contour 6, while the positioning pawl 13 pivots out of the region of the corresponding toothed contour 6. The points of engagement of the two positioning pawls 13 and 14 into the corresponding toothed contour 6 are coordinated with one another in such a way that, when one positioning pawl is released, the wind-on reel can execute a defined rotational movement in the unwinding direction until the secure engagement of the other positioning pawl.

Figure 10:
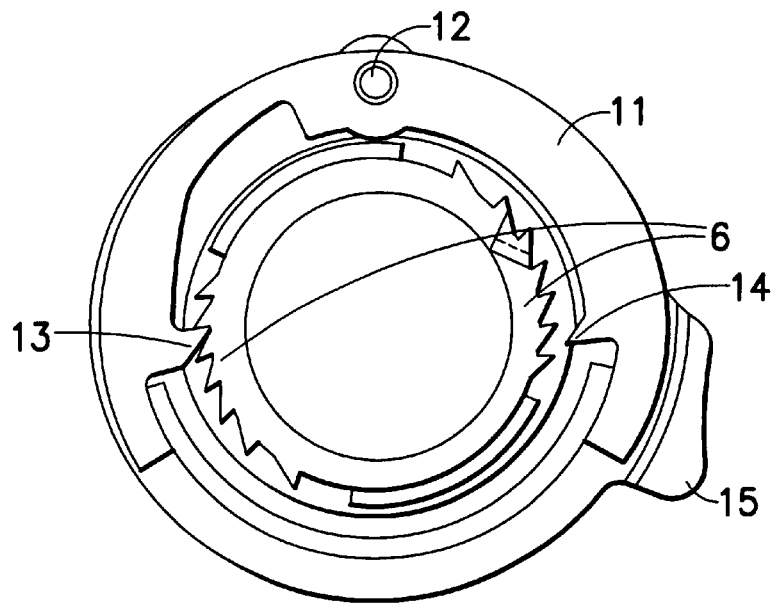
FIG. 10 shows the position of the positioning element after the shifting operation.

FIG. 10 shows the position of the positioning element 11 after the shifting operation. When the actuating button 15 is released, a resetting element, not shown here, returns the actuating button 15 into the position of rest. The positioning element 11 pivots about the pivot axis 12 and consequently pivots the positioning pawl 14 out of the toothed contour 6, while the positioning pawl 13 engages into the corresponding toothed contour 6 and, after the rotational movement of the wind-on reel has taken place, takes over the positioning of the latter. The actuating button 15 and the positioning element 11 form a common structural part.

Figure 11:
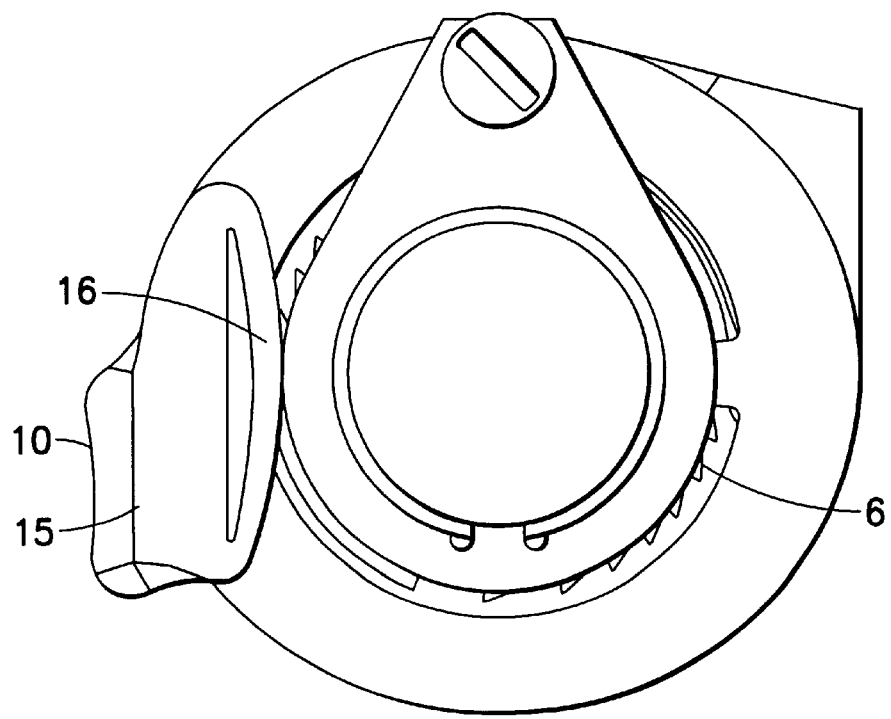
FIG. 11 shows the positioning element with an integrated shift button and resetting element.

FIG. 11 shows a positioning element 11, the actuating button 15 and the resetting element 16 in the form of a flexural spring. This resetting element 16 is arranged in the region of the actuating button 15 on the side located opposite the actuating face 10 and is supported at one end against the housing. The actuating button 15 and the resetting element 11 form a common structural part here.

The invention is not limited by the embodiments described above which are presented as examples only but can be modified in various ways within the scope of protection defined by the appended patent claims.

I claim:

1. A one-way force transmission with a resetting function, comprising:
   a carrier part;
   an actuating element which is arranged one of pivotably and rotatably about an axis of rotation;
   a resetting element operatively arranged to return the actuating element into an initial position after actuation has taken place;
   a rotary element having a toothed contour and arranged one of pivotably and rotatably about an axis of rotation;
   a one-way transmission element prestressed in an engagement direction for force transmission from the actuating element to the rotary element, the one-way transmission element being arranged pivotably on the actuating element; and
   an elastic component operatively arranged to bring about both resetting of the actuating element after the actuating operation has taken place and prestressing of the one-way transmission element.

2. A one-way force transmission as defined in claim 1, wherein the elastic component is a spring element.

3. A one-way force transmission as defined in claim 2, wherein the elastic component has one end supported on the carrier part and another end articulated on the one-way transmission element so that both a resetting force is exerted on the actuating element and a prestressing force is exerted on the one-way transmission element.

4. A one-way force transmission as defined in claim 3, wherein the point of articulation of the spring element on the one-way transmission element is between the axis of rotation or pivot axis of the one-way transmission element and the engagement contour which engages into the contour of the rotary element.

5. A one-way force transmission as defined in claim 4, wherein the point of articulation of the spring element on the one-way transmission element is arranged so that substantially more spring force is provided for resetting the actuating element than for pressing the one-way transmission element.

6. A one-way force transmission as defined in claim 3, wherein the spring element is one of a leg spring, a spiral spring and a helical spring, arranged essentially coaxially to the axis of the rotary element.

7. A one-way force transmission as defined in claim 1 wherein the one-way transmission element is configured so as to transmit reliably, virtually free of wear, the actuating force introduced via the actuating element to the rotary element which is configured as a wind-on reel for a shift assembly of a bicycle gearshift.

8. A one-way force transmission as defined in claims 1, and further comprising a gear-shift housing, the actuating element, the resetting element, the one-way transmission element, and the rotary element being arranged in the gear-shift housing.

9. A one-way force transmission with a resetting function, comprising:
   a carrier part;
   an actuating element which is arranged one of pivotably and rotatably about an axis of rotation;
   a resetting element operative to return the actuating element into an initial position after actuation has taken place;
   a rotary element having a toothed contour and arranged one of pivotably and rotatably about an axis of rotation;
   a transmission element for force transmission from the actuating element to the rotary element; and
   an elastic one-way transmission element prestressed in a radial direction for take-up of the rotary element, one end of the elastic one-way transmission element being fixedly connected to the actuating element so as to form a structural part together with the actuating element.

10. A one-way force transmission as defined in claim 9, wherein a plurality of elastic one-way transmission elements prestressed in the radial direction are arranged on the actuating element for a reliable take-up of the rotary element and for apportioning the forces to be transmitted.

11. A one-way force transmission as defined in claim 9, wherein the one-way transmission element prestressed in the radial direction is configured so as to not engage into the toothed contour of the rotary element when the actuating element is in a rest position, the one-way transmission element being supported on the carrier part.

12. A one-way force transmission as defined in claim 9, wherein the one-way transmission element has a toothlike end portion that engages into the toothed contour of the rotary element during an actuating operation and, during force transmission, can be supported tangentially with a middle portion on an outer contour of the rotary element.

13. A one-way force transmission as defined in claim 9, wherein the actuating element, the one-way transmission element and the resetting element form a common structural part.

14. A one-way force transmission as defined in claim 9, wherein the one-way transmission element is configured so as to transmit reliably, virtually free of wear, the actuating force introduced via the actuating element to the rotary element which is configured as a wind-on reel for a shift assembly of a bicycle gearshift.

15. A one-way force transmission as defined in claim 9, and further comprising a gear-shift housing, the actuating element, the resetting element, the one-way transmission element, and the rotary element being arranged in the gearshift housing.

16. A one-way force transmission with a resetting function, comprising:
   a carrier part;
   an actuating element which is arranged one of pivotably and rotatably about an axis of rotation;
   a resetting element operatively arranging to return the actuating element into an initial position after actuation has taken place;
   a, rotary element having a toothed contour and arranged one of pivotably and rotatably about an axis of rotation;
   a transmission element for force transmission from the actuating element to the rotary element; and
   a holding mechanism for holding and releasing the rotary element located in a selected position, the holding mechanism including a release element with a resetting spring, and a positioning element which is elastic in a middle region and is equipped with two positioning pawls configured for engagement into the toothed contour of the rotary element, both the positioning element and the positioning pawls forming a structural unit.

17. A one-way force transmission as defined in claim 16, wherein the release element is an actuating button which forms a common structural part with the positioning element and the positioning pawls.

18. A one-way force transmission as defined in claim 17, wherein the resetting element is arranged on the actuating button so as to be supported on the carrier part and articulated in a region of the actuating button, the positioning element forming a common structural part with the positioning pawls, the actuating button and the resetting element.

19. A one-way force transmission as defined in claim 16, wherein the release element is an actuating button, and further comprising a spring element provided so as to reset the actuating button after a shift actuation has taken place, the actuating button and the resetting element forming a common structural part.

20. A one-way force transmission as defined in claim 16, wherein the positioning element is one of elastic and flexible approximately in a middle region and, in a mounted state, is prestressed in the direction of the rotary element so that at least one positioning pawl engages the toothed contour of the rotary element.

21. A one-way force transmission as defined in claim 20, wherein the positioning element has appropriate elasticity and flexibility so that the engagement contour of the first positioning pawl comes completely out of engagement even before the engagement contour of the second pawl engages completely.

22. A one-way force transmission as defined in claim 20, wherein the rotary element is wind-on reel for a shift assembly of a bicycle gearshift, the elastic positioning element being supported on the carrier part and engaging with its positioning pawls into the toothed contours of the rotary element so as to absorb reliably, virtually free of wear, a resetting force introduced via the shift assembly.

23. A one-way force transmission as defined in claim 22, and further comprising a gearshift housing, the actuating element, the resetting, the one-way transmission, the rotary element, and the positioning and release element with a resetting spring being arranged in the gearshift housing.

24. A one-way force transmission as defined in claim 16, wherein the shift components are combined into two functional modules including a wind-up or wind-on module, consisting of the actuating element, the resetting element and the one-way transmission element, and a positioning module, consisting of the positioning element with positioning pawls and a release element with a resetting element, the modules being arranged essentially around the rotary element and can engage there into the respective toothed contour.

* * * * *